(12) United States Patent
Chung

(10) Patent No.: US 8,858,840 B2
(45) Date of Patent: Oct. 14, 2014

(54) NANO-SULFUR COMPOSITE ANODE MATERIAL FOR RARE EARTH LITHIUM-SULFUR BATTERY AND ITS PREPARATION METHOD THEREOF

(76) Inventor: Winston Chung, Tai Po (HK)

( * ) Notice: Subject to any disclaimer, the term of this patent is extended or adjusted under 35 U.S.C. 154(b) by 295 days.

(21) Appl. No.: 13/403,952

(22) Filed: Feb. 23, 2012

(65) Prior Publication Data

US 2013/0161557 A1   Jun. 27, 2013

(30) Foreign Application Priority Data

Dec. 27, 2011 (CN) .......................... 2011 1 0443766

(51) Int. Cl.
*H01B 1/04* (2006.01)
*H01M 4/133* (2010.01)

(52) U.S. Cl.
USPC ....................... 252/509; 429/231.8

(58) Field of Classification Search
CPC ........................ H01B 1/04; C08F 1/04; C01B 2202/02–2202/10; C01B 31/022; H01M 4/362; H01M 4/625
USPC ............................... 252/502, 509; 429/231.8
See application file for complete search history.

(56) References Cited

U.S. PATENT DOCUMENTS

| | | | |
|---|---|---|---|
| 7,029,796 B2 * | 4/2006 | Choi et al. | 429/232 |
| 2004/0058246 A1 * | 3/2004 | Choi et al. | 429/232 |

FOREIGN PATENT DOCUMENTS

| | | | |
|---|---|---|---|
| CN | 200910052891 A | * | 6/2009 |
| CN | 101562244 A | * | 10/2009 |
| CN | 101562261 A | * | 10/2009 |
| CN | 102891292 A | * | 1/2013 |
| WO | 2013/097116 A1 | * | 4/2013 |

* cited by examiner

*Primary Examiner* — Mark Kopec
(74) *Attorney, Agent, or Firm* — Raymond Y. Chan; David and Raymond Patent Firm

(57) ABSTRACT

A nano-sulfur composite anode material for rare earth lithium-sulfur battery and its preparation method thereof, wherein the preparation method includes the steps of providing a carbon nanotube and sublimed sulfur, adjusting concentration based on percentage weight, mixing by milling, burning under negative pressure in Argon gas for 5 hours at 200° C.~300° C. and 300° C.~400° C. respectively, and obtaining a final product of nano-sulfur composite anode material for rare earth lithium-sulfur battery. By means of the preparation method of the present invention, the nano-sulfur composite anode material has a particle size <1 micron, a high capacity which is greater than 1000 mAh/g, and a long cycle life (>1000 times). The preparation method has the advantages of simple, low cost and high performance, thereby suitable for industrial production. The rare earth lithium-sulfur battery with the nano-sulfur composite anode material has the advantageous features of high energy density, high cycle performance, environmental friendly and low cost.

3 Claims, No Drawings

NANO-SULFUR COMPOSITE ANODE MATERIAL FOR RARE EARTH LITHIUM-SULFUR BATTERY AND ITS PREPARATION METHOD THEREOF

BACKGROUND OF THE PRESENT INVENTION

1. Field of Invention

The present invention relates to an anode material for lithium battery, and more particularly to a nano-sulfur composite anode material for rare earth lithium-sulfur battery and its preparation method thereof, which is in the field of preparation of rare earth lithium battery material.

2. Description of Related Arts

Lithium-ion battery is classified as the "green" high power battery of the new generation which has superior performance and is the major subject of development in the hi-tech industry. Lithium-ion battery has features of high voltage, high capacity, low depletion, no memory effect, no known pollution effect, compact size, low internal resistance, low self-discharge and high cycle life. At present, lithium-ion battery is widely used in cellular phone, notebook computer, video camera, digital camera and its used has spread from daily household products to electric vehicles and military area. The major components of lithium-ion battery include electrolyte, separation material, anode and cathode materials. The percentage of anode material is relatively high (the mass ratio of anode material is 3:1~4~1) because the performance of the anode material can directly affect the overall performance of the lithium-ion battery. In other words, the cost of anode material is the determining factor on the cost of the battery.

At present, the common anode materials of lithium-ion battery are lithium iron phosphate, lithium manganese or ternary material such as lithium nickel manganese material. These types of materials has the problem of insufficient power which fails to meet the need of the present development such as the requirement in the fast developing electric vehicle industry.

SUMMARY OF THE PRESENT INVENTION

An object of the present invention is to provide a solution to the above technical problems and to provide a high energy density, long cycle life, environmental friendly and low cost anode material for rare earth lithium-sulfur battery.

Additional advantages and features of the invention will become apparent from the description which follows, and may be realized by means of the instrumentalities and combinations particular point out in the appended claims.

According to the present invention, the foregoing and other objects and advantages are attained by a nano-sulfur composite anode material for rare earth lithium-sulfur battery and its preparation method thereof.

The first technical problem is solved by the provision of the followings:

The nano-sulfur composite anode material for rare earth lithium-sulfur battery according to the preferred embodiment of the present invention has a composition by weight as follows:

| | |
|---|---|
| carbon nantube | 1~2 |
| sublimed sulfur | 5 |
| rare earth yttrium oxide | 0.67~0.78 |

The following is further provided to solve the first technical problem mentioned above.

The carbon nanotube is a multiwalled carbon nanotube.

The second technical problem is solved by the provision of the followings:

A preparation method of nano-sulfur composite anode material for rare earth lithium-sulfur battery according to the preferred embodiment of the present invention comprises the steps of:

(1) obtaining a carbon nanotube and a sublimed sulfur by weight ratio, where a weight ratio of the carbon nanotube is 1~2 and a weight ratio of the sublimed sulfur is 5;

(2) adding 65% alcohol to the carbon nanotube and the sublimed sulfur from step (1), where a weight ratio of the nanotube and the sublimed sulfur to the alcohol is 2:1, then milling for at least 10 hours to obtain an intermediate mixture;

(3) drying the intermediate mixture from step (2) at 90~100° C. under a protective gas flow of $N_2$ for 8~24 hours to form a dried intermediate mixture;

(4) first-stage burning the dried intermediate mixture from step (3) under a negative pressure of −0.1~−0.5 atmos at 200° C.~300° C. for 5 hours to obtain a molten sulfur coated carbon nanotube material;

(5) adding the molten sulfur coated carbon nanotube material from step (4) into 65% alcohol in which a weight ratio of the molten sulfur coated carbon nanotube material to alcohol is 2:1, and grinding by high speed grinding machine to obtain an intermediate carbon nanotube material having a particle size of 1 micron;

(6) drying the intermediate carbon nanotube material from step (5) at 90~100° C. under a protective gas flow of $N_2$ for 8~24 hours to obtain a dried intermediate carbon nanotube material;

(7) second-stage burning the dried intermediate carbon nanotube material from step (6) at 300° C.~400° C. in flowing Argon gas environment for 5 hours to obtain a carbon nanotube-sulfur composite material; and (8) adding rare earth yttrium oxide (10%) to the carbon nanotube-sulfur composite material from step (7), where a percentage weight of the carbon nanotube-sulfur composite material and the rare earth yttrium oxide is 9:1, then processing by jet milling and grading to obtain the nano-sulfur composite anode material which has a particle size of 1 micron.

Compared to conventional arts, the advantageous effect of the present invention are as follows:

The nano-sulfur composite anode material for rare earth lithium-sulfur battery according to the present invention utilizes calcination of carbon nanotube and sublimed sulfur. Under high temperature and vacuum conditions, the molten sublimed sulfur is sucked into the carbon nanotube by capillary action. Then, further increase in temperature will result in removal of the excess sublimed sulfur, and a final product of carbon nanotube (with sublimed sulfur) is obtained, which is the nano-sulfur composite anode material. The final product of anode material has high electron and ion conductivity and high capacity which improve the cycling ability of the sulfur and lithium sulfur in aqueous electrolytes. The preparation method is simple and can be used for mass production, thereby suitable for anode material for lithium-sulfur battery. Because (elemental) sulfur has poor conductivity which contributes to the unstable factor of lithium-sulfur in aqueous electrolyte, therefore it fails to provide high performance in aqueous electrolyte. By means of the preparation method of the present invention, the nano-sulfur composite anode material has a particle size <1 micron, a high capacity which is greater than 1000 mAh/g, and a long cycle life (>1000 times). The preparation method has the advantages of simple, low cost and high performance, thereby suitable for industrial production. The rare earth lithium-sulfur battery with the nano-sulfur composite anode material has the advantageous features of high energy density, high cycle performance, environmental friendly and low cost.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The present invention is further described in the following exemplary embodiments according to the preferred embodiment of the present invention.

Exemplary Embodiment 1

A nano-sulfur composite anode material for rare earth lithium-sulfur battery according to the preferred embodiment of the present invention which has a composition by weight of the followings:

| | |
|---|---|
| multiwalled carbon nantube | 1 |
| sublimed sulfur | 5 |
| rare earth yttrium oxide | 0.67 |

A preparation method of nano-sulfur composite anode material for rare earth lithium-sulfur battery according to the preferred embodiment of the present invention comprises the steps of:

(1) obtaining a carbon nanotube and a sublimed sulfur by weight ratio, where a weight ratio of the carbon nanotube is 1 and a weight ratio of the sublimed sulfur is 5;

(2) adding 65% alcohol to the carbon nanotube and the sublimed sulfur from step (1), where a weight ratio of the nanotube and the sublimed sulfur to the alcohol is 2:1, then milling for at least 10 hours to obtain an intermediate mixture;

(3) drying the intermediate mixture from step (2) at 100° C. under a protective gas flow of $N_2$ for 24 hours to form a dried intermediate mixture;

(4) first-stage burning the dried intermediate mixture from step (3) under a negative pressure of −0.1 atmos at 200° C. for 5 hours to obtain a molten sulfur coated carbon nanotube material;

(5) adding the molten sulfur coated carbon nanotube material from step (4) into 65% alcohol in which a weight ratio of the molten sulfur coated carbon nanotube material to alcohol is 2:1, and grinding by high speed grinding machine to obtain an intermediate carbon nanotube material having a particle size of 1 micron;

(6) drying the intermediate carbon nanotube material from step (5) at 100° C. under a protective gas flow of $N_2$ for 24 hours to obtain a dried intermediate carbon nanotube material;

(7) second-stage burning the dried intermediate carbon nanotube material from step (6) at 300° C. in flowing Argon gas environment for 5 hours to obtain a carbon nanotube-sulfur composite material; and (8) adding rare earth yttrium oxide (10%) to the carbon nanotube-sulfur composite material from step (7), where a percentage weight of the carbon nanotube-sulfur composite material and the rare earth yttrium oxide is 9:1, then processing by jet milling and grading to obtain the nano-sulfur composite anode material which has a particle size of 1 micron.

Exemplary Embodiment 2

A nano-sulfur composite anode material for rare earth lithium-sulfur battery according to the preferred embodiment of the present invention which has a composition by weight of the followings:

| | |
|---|---|
| multiwalled carbon nantube | 1.5 |
| sublimed sulfur | 5 |
| rare earth yttrium oxide | 0.72 |

A preparation method of nano-sulfur composite anode material for rare earth lithium-sulfur battery according to the preferred embodiment of the present invention comprises the steps of:

(1) obtaining a carbon nanotube and a sublimed sulfur by weight ratio, where a weight ratio of the carbon nanotube is 1 and a weight ratio of the sublimed sulfur is 5;

(2) adding 65% alcohol to the carbon nanotube and the sublimed sulfur from step (1), where a weight ratio of the nanotube and the sublimed sulfur to the alcohol is 2:1, then milling for at least 10 hours to obtain an intermediate mixture;

(3) drying the intermediate mixture from step (2) at 95° C. under a protective gas flow of $N_2$ for 20 hours to form a dried intermediate mixture;

(4) first-stage burning the dried intermediate mixture from step (3) under a negative pressure of −0.2 atmos at 250° C. for 6 hours to obtain a molten sulfur coated carbon nanotube material;

(5) adding the molten sulfur coated carbon nanotube material from step (4) into 65% alcohol in which a weight ratio of the molten sulfur coated carbon nanotube material to alcohol is 2:1, and grinding by high speed grinding machine to obtain an intermediate carbon nanotube material having a particle size of 1 micron;

(6) drying the intermediate carbon nanotube material from step (5) at 95° C. under a protective gas flow of $N_2$ for 20 hours to obtain a dried intermediate carbon nanotube material;

(7) second-stage burning the dried intermediate carbon nanotube material from step (6) at 300° C. in flowing Argon gas environment for 6 hours to obtain a carbon nanotube-sulfur composite material; and (8) adding rare earth yttrium oxide (10%) to the carbon nanotube-sulfur composite material from step (7), where a percentage weight of the carbon nanotube-sulfur composite material and the rare earth yttrium oxide is 9:1, then processing by jet milling and grading to obtain the nano-sulfur composite anode material which has a particle size of 1 micron.

Exemplary Embodiment 3

A nano-sulfur composite anode material for rare earth lithium-sulfur battery according to the preferred embodiment of the present invention which has a composition by weight of the followings:

| | |
|---|---|
| multiwalled carbon nantube | 2 |
| sublimed sulfur | 5 |
| rare earth yttrium oxide | 0.78 |

A preparation method of nano-sulfur composite anode material for rare earth lithium-sulfur battery according to the preferred embodiment of the present invention comprises the steps of:

(1) obtaining a carbon nanotube and a sublimed sulfur by weight ratio, where a weight ratio of the carbon nanotube is 2 and a weight ratio of the sublimed sulfur is 5;

(2) adding 65% alcohol to the carbon nanotube and the sublimed sulfur from step (1), where a weight ratio of the nanotube and the sublimed sulfur to the alcohol is 2:1, then milling for at least 10 hours to obtain an intermediate mixture;

(3) drying the intermediate mixture from step (2) at 90° C. under a protective gas flow of $N_2$ for 16 hours to form a dried intermediate mixture;

(4) first-stage burning the dried intermediate mixture from step (3) under a negative pressure of −0.5 atmos at 300° C. for 7 hours to obtain a molten sulfur coated carbon nanotube material;

(5) adding the molten sulfur coated carbon nanotube material from step (4) into 65% alcohol in which a weight ratio of the molten sulfur coated carbon nanotube material to alcohol is 2:1, and grinding by high speed grinding machine to obtain an intermediate carbon nanotube material having a particle size of 1 micron;

(6) drying the intermediate carbon nanotube material from step (5) at 90° C. under a protective gas flow of $N_2$ for 16 hours to obtain a dried intermediate carbon nanotube material;

(7) second-stage burning the dried intermediate carbon nanotube material from step (6) at 400° C. in flowing Argon gas environment for 7 hours to obtain a carbon nanotube-sulfur composite material; and (8) adding rare earth yttrium oxide (10%) to the carbon nanotube-sulfur composite material from step (7), where a percentage weight of the carbon nanotube-sulfur composite material and the rare earth yttrium oxide is 9:1, then processing by jet milling and grading to obtain the nano-sulfur composite anode material which has a particle size of 1 micron.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A nano-sulfur composite anode material for rare earth lithium-sulfur battery, having a composition by weight consisting of the following constituents:

1~2 gram of carbon nanotube;

5 gram of sublimed sulfur; and 0.67~0.78 gram of yttrium oxide.

2. The nano-sulfur composite anode material for rare earth lithium-sulfur battery, as recited in claim 1, wherein said carbon nanotube is a multiwalled carbon nanotube.

3. A preparation method of nano-sulfur composite anode material for rare earth lithium-sulfur battery, comprising the steps of:

(a) obtaining a carbon nanotube and a sublimed sulfur to form an initial mixture in which a weight ratio of said carbon nanotube and said sublimed sulfur is 1~2:5;

(b) adding alcohol with 65% concentration to said initial mixture of said carbon nanotube and said sublimed sulfur from step (a), where a weight ratio of said initial mixture of said nanotube and said sublimed sulfur to said alcohol is 2:1, then milling for at least 10 hours to obtain an intermediate mixture;

(c) drying said intermediate mixture from step (b) at 90~100° C. under a protective gas flow of $N_2$ for 8~24 hours to form a dried intermediate mixture;

(d) first-stage burning said dried intermediate mixture under a negative pressure of −0.1~0.5 atmos at 200~300° C. for 5 hours to obtain a molten sulfur coated carbon nanotube material;

(e) adding said molten sulfur coated carbon nanotube material into 65% alcohol in which a weight ratio of said molten sulfur coated carbon nanotube material to alcohol is 2:1, and grinding by high speed grinding machine to obtain an intermediate carbon nanotube material having a particle size of 1 micron;

(f) drying said intermediate carbon nanotube material at 90~100° C. under a protective gas flow of $N_2$ for 8~24 hours to obtain a dried intermediate carbon nanotube material;

(g) second-stage burning said dried intermediate carbon nanotube material from step (f) at 300~400° C. in Argon gas environment for 5 hours to obtain a carbon nanotube-sulfur composite material; and (h) adding yttrium oxide (10%) to said carbon nanotube-sulfur composite material, where a percentage weight of the total composition between said carbon nanotube-sulfur composite material and said yttrium oxide is 9:1, then processing by jet milling and grading to obtain said nano-sulfur composite anode material which has a particle size of 1 micron.

* * * * *